United States Patent
Yokemura et al.

(10) Patent No.: US 7,770,881 B2
(45) Date of Patent: Aug. 10, 2010

(54) SHEET MATERIAL FEEDING DEVICE HAVING A SHEET GUIDE PART

(75) Inventors: Takeshi Yokemura, Kanagawa (JP); Shinji Masaki, Kanagawa (JP); Koji Udagawa, Kanagawa (JP); Yumiko Kurosawa, Kanagawa (JP); Masahiro Mori, Kanagawa (JP); Masayoshi Nishida, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 584 days.

(21) Appl. No.: 11/389,016

(22) Filed: Mar. 27, 2006

(65) Prior Publication Data

US 2007/0008588 A1    Jan. 11, 2007

(30) Foreign Application Priority Data

Jun. 27, 2005    (JP)    ............... 2005-187182

(51) Int. Cl.
B65H 5/00    (2006.01)
(52) U.S. Cl. .................. 271/10.13; 271/10.11
(58) Field of Classification Search .............. 271/10.13, 271/10.01, 10.09, 10.11
See application file for complete search history.

(56) References Cited

U.S. PATENT DOCUMENTS

| | | | |
|---|---|---|---|
| 5,664,771 A * | 9/1997 | Nagatani et al. ......... | 271/10.03 |
| 6,332,608 B1 | 12/2001 | Tamura ................. | 271/111 |
| 2002/0101025 A1* | 8/2002 | Lee et al. ............... | 271/10.11 |
| 2004/0223797 A1 | 11/2004 | Ueda .................... | 399/388 |
| 2005/0151313 A1* | 7/2005 | Shimazaki .............. | 271/10.01 |
| 2006/0220297 A1* | 10/2006 | Kusumi ................. | 271/10.01 |

FOREIGN PATENT DOCUMENTS

| | | |
|---|---|---|
| JP | HEI-07-081792 | 3/1995 |
| JP | 2002-68495 | 3/2002 |
| JP | 2006-327700 | 12/2006 |

* cited by examiner

*Primary Examiner*—Patrick Mackey
*Assistant Examiner*—Gerald W McClain
(74) *Attorney, Agent, or Firm*—Morgan, Lewis & Bockius LLP (57) ABSTRACT

A sheet material feeding device comprises a sheet material housing part housing a sheet bundle having a plurality of sheet being stacked; a conveying-out unit press-contacting onto the front edge side of the upper surface of the sheet bundle to exert a push-out force, feeding a sheet by the push-out force in a predetermined conveying-out direction, and separating the sheet from the sheet bundle; a feeding unit arranged on the downstream side of the sheet material housing part along the conveying-out direction and continuing the feeding of the sheet, and after the conveying-out unit moves away from the rear edge of a preceding sheet, the conveying-out unit conveys a following sheet in a state that the following sheet is overlapped at the lower side of the preceding sheet until the front edge of the following sheet reaches a predetermined guide position set between the sheet bundle and the feeding unit.

13 Claims, 5 Drawing Sheets

SHEET MATERIAL FEEDING DEVICE HAVING A SHEET GUIDE PART

CROSS-REFERENCE TO RELATED APPLICATION

This application claims priority under 35 USC 119 from Japanese Patent Application No. 2005-187182, the disclosure of which is incorporated by reference herein.

BACKGROUND

1. Technical Field

The present invention relates to a sheet material feeding device which is applied to a copier, facsimile, and printer, separates one sheet from a sheet bundle having plural stacked sheets such as sheets of recording paper and OHP sheet material, and feeds the one sheet in a predetermined conveying-out direction.

2. Related Art

In general, an image forming apparatus such as a printer, copier, and facsimile is provided with a sheet material feeding device as part of the apparatus body in order to automatically feed a sheet material as a recording medium such as recording paper and an OHP sheet to an image formation part or the sheet material feeding device can be added as an option unit (sheet material feeding unit). Such a sheet material feeding device has a sheet feeding cassette that can house a sheet bundle having plural stacked sheets and is removably fitted in the body part of the apparatus, and a separating and sheet feeding mechanism that separates one sheet from the sheet bundle housed in the sheet feeding unit and conveys it out from within the sheet feeding cassette. In the sheet material feeding device, the separating and sheet feeding mechanism separates one sheet from the sheet feeding cassette in synchronization with the start of image formation of the image formation part of the image forming apparatus and conveys the one sheet out from within the sheet feeding cassette to the conveying path of the sheet material. The sheet material is automatically fed through the conveying path to the image formation part to form an image on the sheet material.

SUMMARY

In consideration of the above circumstances, the present invention provides a sheet material feeding.

A sheet material feeding device according to a first aspect of the present invention including: a sheet material housing part housing a sheet bundle having plural sheets being stacked; a conveying-out unit press-contacting onto the front edge side of the upper surface of the sheet bundle housed in the sheet material housing part to exert a push-out force, feeding a sheet stacked on the upper edge side of the sheet bundle by the push-out force in a predetermined conveying-out direction, and separating the sheet from the sheet bundle; a feeding unit arranged on the downstream side of the sheet material housing part along the conveying-out direction and continuing the feeding of the sheet fed from the sheet bundle by the conveying-out unit in the conveying-out direction, and after the conveying-out unit moves away from the rear edge of a preceding sheet, the conveying-out unit conveys a following sheet in the conveying-out direction in a state that the following sheet is overlapped at the lower side of the preceding sheet until the front edge of the following sheet reaches a predetermined guide position set between the sheet bundle and the feeding unit.

BRIEF DESCRIPTION OF THE DRAWINGS

Embodiments of the present invention will be described in detail based on the following figures, wherein.

DETAILED DESCRIPTION

A sheet material feeding device according to embodiments of the present invention will be described below with reference to the drawings.

First Embodiment

Figure 1:
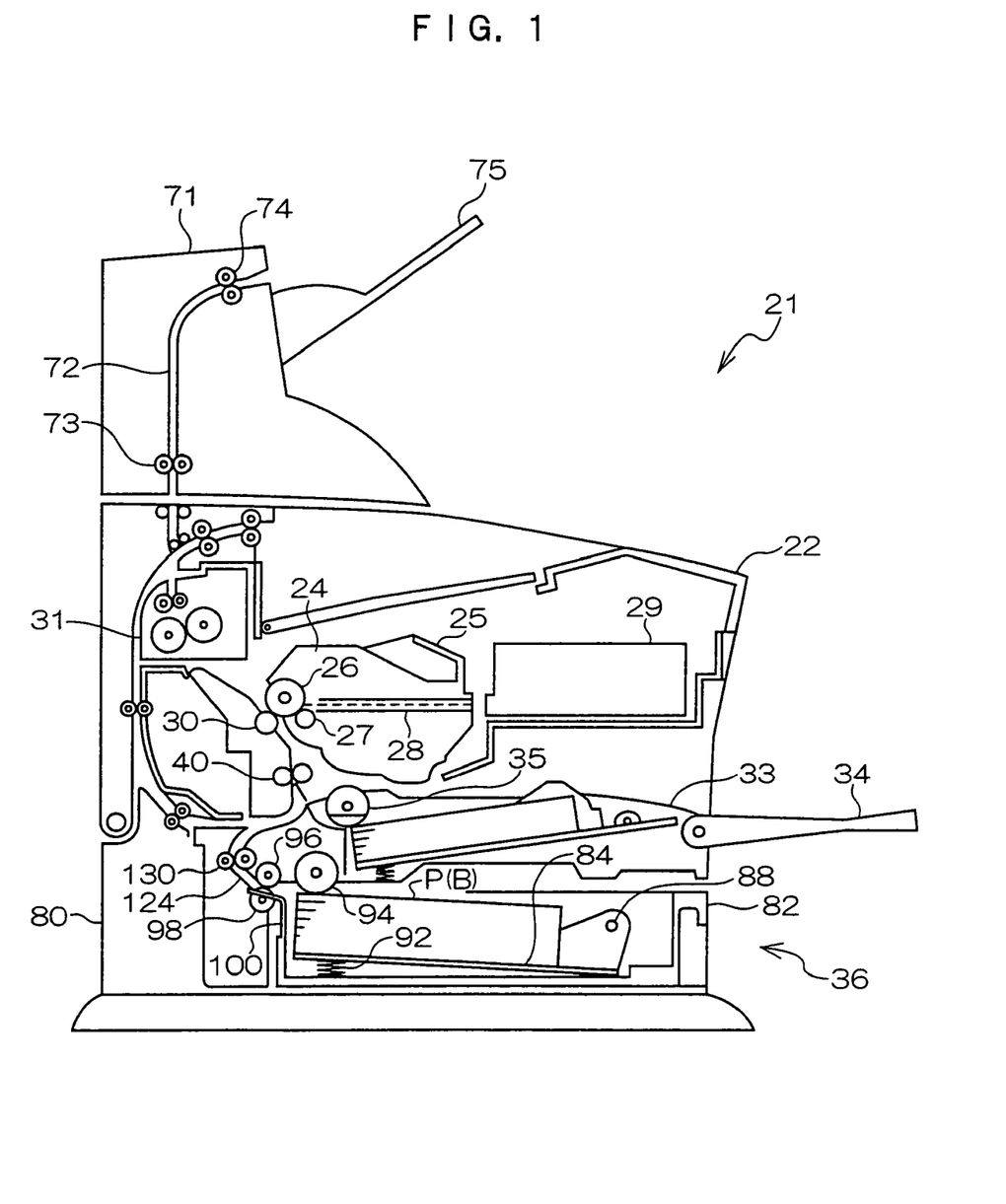
FIG. 1 is a side cross-sectional view showing the construction of a laser printer applying a sheet feeding mechanism according to a first embodiment of the present invention.

FIG. 1 shows a laser printer applying a sheet feeding mechanism according to a first embodiment of the present invention. A laser printer 21 has an apparatus body 22 for forming an image on a recording paper P as a sheet material and a high capacity stacker (HCS) 71. The apparatus body 22 is provided in its inside with a process cartridge 25 as an image formation unit for the recording paper P. The process cartridge 25 has a toner tank part 24 housing developing powder including toner, a photoconductor drum 26 as an image carrier, a mag roll 27 attaching toner to the photoconductor drum 26 using an electrostatic method, and a non illustrated charging device and cleaner, and is removably fitted in the apparatus body 22. The apparatus body 22 is provided with an image writing device (ROS) 29 such as a laser scanning device adjacent to the process cartridge 25. The laser printer 21 exposes the charged photoconductor drum 26 via a slit-like exposure path 28 provided in the process cartridge 25 by a laser beam. The ROS 29 forms an electrostatic latent image on the photoconductor drum 26 based on a digital image signal from an image processing part (IPS), not shown, according to an image output instruction imputed from a host device such as a personal computer (PC), not shown.

The apparatus body 22 is provided with a transfer roll 30 to be opposite to the photoconductor drum 26. The transfer roll 30 transfers a toner image formed on the photoconductor drum 26 onto the conveyed recording paper P. The recording paper P is conveyed to a fixing device 31. The fixing device 31 has a function of fixing an unfixed toner image formed on the recording paper P by thermal fixing. The apparatus body 22 has a control part, not shown. The control part executes various controls when image forming, later-described feeding, and conveying of the recording paper P, and control of an option device.

In the apparatus body 22, the reference numeral 33 denotes a multi-sheet material inserter, that can be fitted and removed in the state when stacked with the recording paper P of a chosen size and assist conveying of the recording paper P of a size longer in the sheet material conveying direction by opening a paper tray 34. The recording paper P stacked on the multi-sheet material inserter 33 is conveyed to the image formation part consisting of the photoconductor drum 26 by rotation of a half-moon shaped feed roll 35.

The apparatus body 22 is provided on its lower side with a sheet feeding mechanism 36 as a sheet material feeding device for automatically feeding the recording paper P to the image formation part. The sheet feeding mechanism 36 is provided with a body side sheet feeding part 80 constructed as part of the apparatus body 22, and a sheet feeding cassette 82 removably fitted in the body side sheet feeding part 80. The sheet feeding cassette 82 is provided in its inside with a bottom plate 84 swingably supported at support shafts 88 provided in side plate parts on both sides of the sheet feeding cassette 82 and raising the recording paper P by a coil spring 92. A bundle of plural stacked sheets of recording paper P (hereinafter, called a "sheet bundle B" when it is necessary to discriminate from "recording paper P") is placed on the bottom plate 84.

Figure 2:
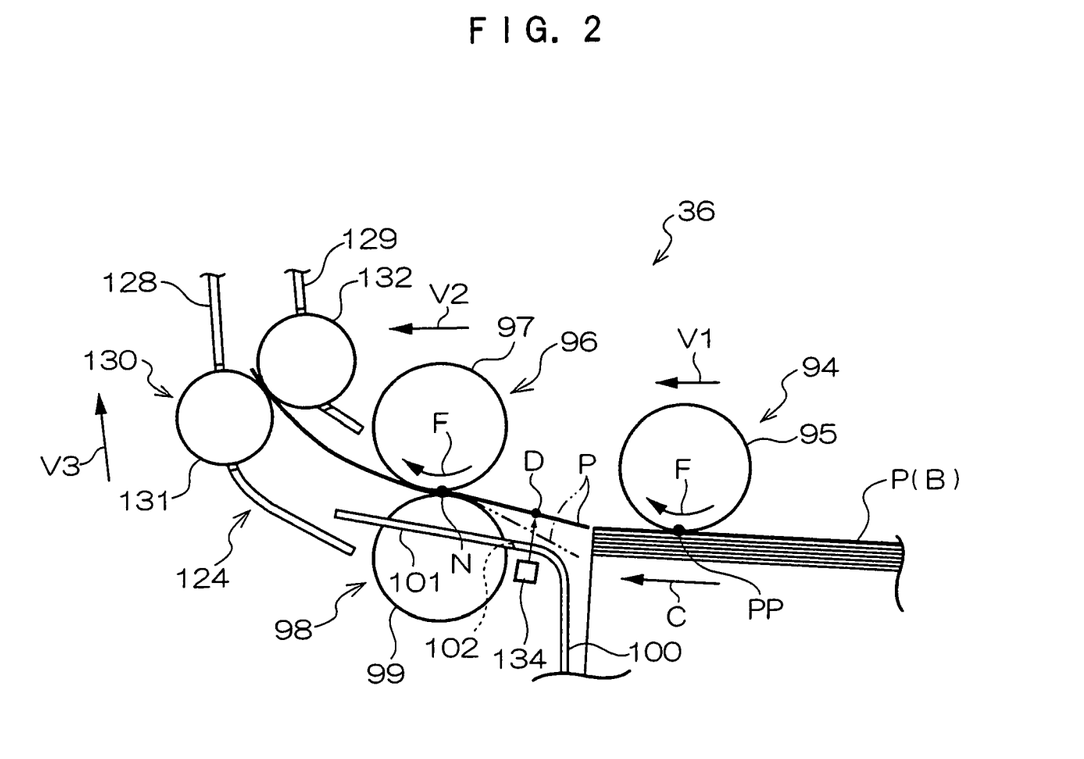
FIG. 2 is a side view showing the construction of the sheet feeding mechanism according to the first embodiment of the present invention.

As shown in FIG. 2, the sheet feeding mechanism 36 is provided with a nudger roll 94 above the bottom plate 84. The nudger roll 94 press-contacts a roll surface 95 thereof onto the front edge side of the top surface part of the sheet bundle B placed on the bottom plate 84. The sheet feeding mechanism 36 rotates the nudger roll 94 in a normal rotation direction (in the arrow F direction) to feed one or plural sheets of recording paper P from the upper edge side of the sheet bundle B in the predetermined conveying-out direction (in the arrow C direction). Here, the conveying-out direction is a direction substantially matched with a direction of a tangent of the press-contact part of the roll surface 95 of the nudger roll 94 at the sheet bundle B, from the rear edge side of the recording paper P toward the front edge side thereof.

The sheet feeding mechanism 36 is provided with a feed roll 96 and a retard roll 98 on the downstream side of the nudger roll 94 along the conveying-out direction. The retard roll 98 is arranged on the lower side of the feed roll 96 and press-contacts a roll surface 99 thereof onto a roll surface 97 of the feed roll 96 with a predetermined press-contact force. The sheet feeding cassette 82 (see FIG. 1) is provided in the side wall part of the front edge side with a conveying-out guide plate 100 constructing part of the sheet feeding mechanism 36. The conveying-out guide plate 100 is made of a metal plate bent in substantially inverted V shape, has its lower edge fixed to the side wall part of the sheet feeding cassette 82, and is supported to be extended upward from the side wall part.

As shown in FIG. 2, a guide part 101 extended to the downstream side substantially parallel with the conveying-out direction of the recording paper P is bent and formed on the upper edge side of the conveying-out guide plate 100. The guide part 101 is formed with a notch part 102 notched in a U shape from its front edge toward the bent part side. The upper edge side of the retard roll 98 is protruded through the notch part 102 above the guide part 101. Even if the front edge side of the recording paper P fed by the nudger roll 94 from the upper edge side of the sheet bundle B in the conveying-out direction is bent downward, the recording paper P can be prevented from entering the lower side of the retard roll 98 by the guide part 101 of the conveying-out guide plate 100 and can be reliably inserted into a nip part N, a press-contact part of the feed roll 96 and the retard roll 98.

Figure 3:
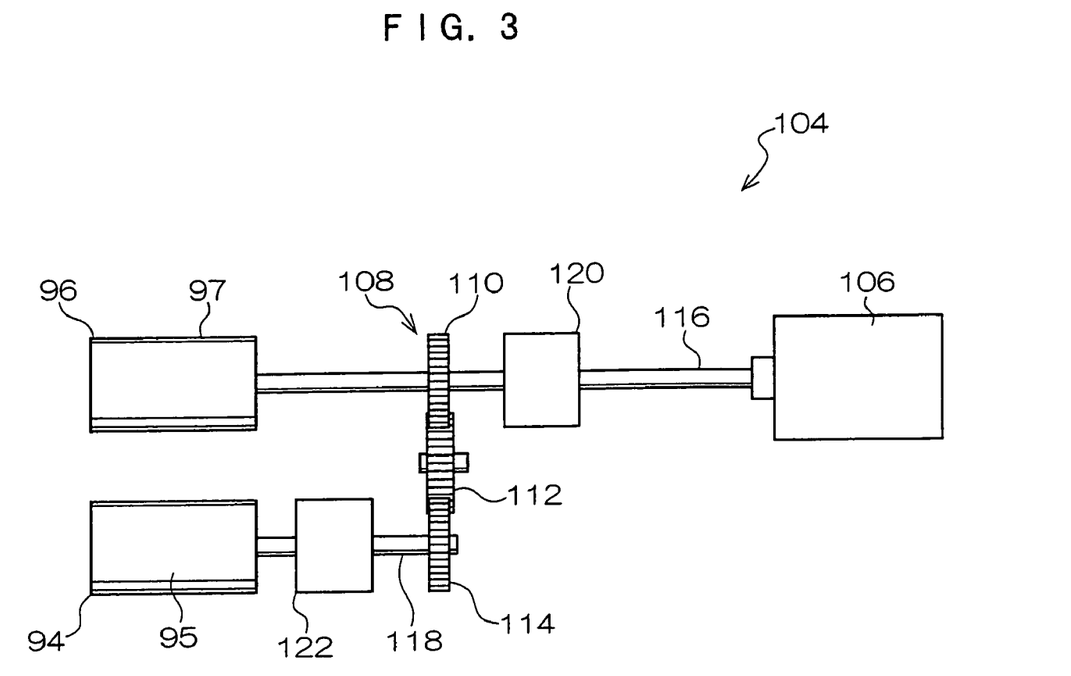
FIG. 3 is a plan view showing the construction of a gear train transmitting torque from a driving motor to a nudger roll and a feed roll in the sheet feeding mechanism shown in FIG. 2.

As shown in FIG. 3, the sheet feeding mechanism 36 is provided with a roll-driving control part 104 for transmitting torque to the nudger roll 94, the feed roll 96, and the retard roll 98 and controlling the torque transmitted to the rolls 94, 96, and 98. The roll-driving control part 104 is provided with a driving motor 106, as a torque production source, and a gear train 108 which can be coupled to the driving motor 106 so as to transmit torque to the nudger roll 94, the feed roll 96, and the retard roll 98. The gear train 108 is provided with a driving gear 110, an idle gear 112 and a first follower gear (not shown) engaged with the driving gear 110 in different positions. The idle gear 112 is provided with a second follower gear 114.

The driving gear 110 is arranged in the middle portion in the axial direction of a driving shaft 116 coaxially coupling the driving motor 106 and the feed roll 96. The second follower gear 114 is arranged at the front edge of a second follower shaft 118 coaxially fixed to the nudger roll 94. The first follower gear is arranged at the front edge of the first follower shaft (not shown) coaxially fixed to the retard roll 98. In the roll-driving control part 104, a first one-way clutch 120 is arranged between the driving motor 106 and the driving gear 110 of the driving shaft 116 and a second one-way clutch 122 is arranged between the nudger roll 94 and the second follower shaft 114 of the second follower shaft 118. In the roll-driving control part 104, a torque limiter (not shown) is arranged between the retard roll 98 and the first follower gear of the first follower shaft.

The first one-way clutch 120 controls (blocks) torque transmission from the driving motor 106 to the feed roll 96 so as to permit rotation of the feed roll 96 following the recording paper P when the recording paper P is moved in the conveying-out direction faster than the linear velocity of the feed roll 96. The second one-way clutch 122 also controls (blocks) torque transmission from the second follower gear 114 to the nudger roll 94 so as to permit rotation of the nudger roll 94 following the recording paper P when the recording paper P is moved in the conveying-out direction faster than the linear velocity of the nudger roll 94.

The torque limiter rotates (idles) the retard roll 98 in the normal rotation direction following the recording paper P in the case of one sheet of recording paper P being fed from the sheet bundle B by the nudger roll 94 and rotates the retard roll 98 in a reverse rotation direction opposite the normal rotation direction by torque from the driving motor 106 in the case of plural sheets of recording paper P fed from the sheet bundle B. In the case of one sheet of recording paper P fed from the sheet bundle B by the nudger roll 94, the one sheet of recording paper P is nipped by the feed roll 96 and the retard roll 98 to be fed to a conveying guide path 124 side. In the case of plural sheets of recording paper P fed from the sheet bundle B by the nudger roll 94, only the topmost recording paper P is fed to the conveying guide path 124 side by the feed roll 96 in the normal rotation and the remaining sheets of recording paper P are fed back to the nudger roll 94 side by the retard roll 98 in the reverse rotation.

As shown in FIG. 2, the body side sheet feeding part 80 of the laser printer 21 is provided with the conveying guide path 124 tilted or curved diagonally upward from the downstream side of the nip part N of the feed roll 96 and the retard roll 98. The conveying guide path 124 is extended from the downstream side of the nip part N of the feed roll 96 and the retard roll 98 to the nip part (transfer position) of the photoconductor drum 26 and the transfer roll 30.

The conveying guide path 124 has a pair of guide plates 128 and 129 opposite each other at a predetermined pitch. The recording paper P can pass in a slit-like space formed between the guide plates 128 and 129 to the transfer position while it is guided by the guide plates 128 and 129. The conveying guide path 124 is provided with a conveying roll pair 130 consisting of a follower roll 131 and a driving roll 132 contacted with each other. The conveying roll pair 130 nips the one sheet of recording paper P fed into the conveying guide path 124 by the feed roll 96 and the retard roll 98 and conveys the recording paper P to the transfer position side along the conveying guide path 124.

In the sheet feeding mechanism 36, a gear ratio from the driving gear 110 to the second follower gear 114 of the gear train 108 is set so that a linear velocity V1 (see FIG. 2) of the roll surface 95 of the nudger roll 94 is slower than a linear velocity V2 of the roll surface 97 of the nudger roll 96 by a predetermined velocity. In the sheet feeding mechanism 36, a rotating speed of the driving roll 132 is set so that the linear velocity V2 of the roll surface 97 of the feed roll 96 is slower than a linear velocity V3 of a roll surface of the driving roll 132 of the conveying roll pair 130 by a predetermined velocity.

As shown in FIG. 2, the sheet feeding mechanism 36 is provided with a gap sensor 134 on the lower side of the guide part 101 of the conveying-out guide part 100. The gap sensor 134 detects a distance to the lower surface of the recording paper P passing through a detection position D between the nudger roll 94 and the feed roll 96 and the retard roll 98 and outputs a detecting signal, corresponding to the distance, to the control part (not shown) of the laser printer 21. The control part judges that the rear edge of the recording paper P has passed through the detected position based on the detecting signal from the gap sensor 134.

As shown in FIG. 1, in the laser printer 21, the high capacity stacker (HCS) 71 as an option device is connected to the apparatus body 22. The HCS 71 is configured to form a conveying path 72 having conveying rolls 73 and can discharge the recording paper P to a discharge tray 75 by discharge rolls 74. The discharge rolls 74 can shift a predetermined number of papers in the right and left directions and shifts plural sheets of recording paper P according to job information from a host device to stack them on the discharge tray 75, permitting offset output. The discharge tray 75 is designed to stack a large amount of about 500 sheets of recording paper P. When the recording paper P is fed to the conveying path 72 of the HCS 71, the apparatus body 22 switches the gates based on a control signal of the control part to form a conveying path in the direction of the conveying path 72 and rotates the conveying rolls. The recording paper P formed with an image is conveyed via the gate to the downstream by the conveying rolls and is stacked on the discharge tray 75 in the state that it is offset by the discharge rolls 74.

Next, the operation and function of the thus-constructed sheet feeding mechanism 36 according to this embodiment will be described.

In the laser printer 21 applying the sheet feeding mechanism 36 according to this embodiment, the control part starts rotating the driving motor 106 of the sheet feeding mechanism 36 and the driving motor (not shown) of the conveying system when a print instruction and image information are inputted from an information processing device such as a server and a PC to the control part. Accordingly in the sheet feeding mechanism 36, torque is transmitted from the driving motor 106 via the gear train 108 to the nudger roll 94, the feed roll 96, and the retard roll 98 and is transmitted from the driving motor of the conveying system to the driving roll 132 of the conveying roll pair 130. The conveying roll pair 130 starts rotating at a rotating speed corresponding to the linear velocity V3 and the nudger roll 94 starts rotating at a rotating speed corresponding to the linear velocity V1. The feed roll 96 starts rotating at a rotating speed corresponding to the linear velocity V2. The retard roll 98 to which torque is transmitted from the driving motor 106 via the torque limiter rotates at a rotating speed corresponding to the linear velocity V2 following the feed roll 96.

In the sheet feeding mechanism 36, the nudger roll 94 rotated in the normal rotation direction feeds one or plural sheets of recording paper P from the upper edge side of the sheet bundle B housed in the sheet feeding cassette 82 in the conveying-out direction. First, using FIGS. 4A to 4D, one sheet of recording paper P (which is the Nth (N is a natural number of 1 or above) sheet of recording paper fed from the sheet bundle B placed in the sheet feeding cassette 82) being fed by the nudger roll 94 from the upper edge side (the topmost part) of the sheet bundle B in the conveying-out direction will be described. The front edge of the Nth sheet of recording paper P fed by the nudger roll 94 in the conveying-out direction is detected by the gap sensor 134. At this time the control part judges the presence or absence of any feed miss by output timing of a detection signal from the gap sensor 134.

Figure 4A:
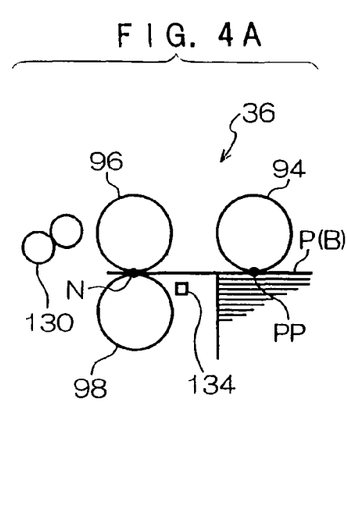
FIGS. 4A, 4B, 4C and 4D are side views of the sheet feeding mechanism explaining the operation when the sheet feeding mechanism shown in FIG. 2 conveys a recording paper out from the upper edge side of a sheet bundle.

As shown in FIG. 4A, the front edge of the Nth sheet of recording paper P is inserted into the nip part N of the feed roll 96 and the retard roll 98. The feed roll 96 and the retard roll 98 start conveying the recording paper P in the conveying-out direction at the linear velocity V2 faster than the linear velocity V1 of the nudger roll 94 while the recording paper P is nipped. At this time, the nudger roll 94 is rotated at a rotating speed corresponding to the linear velocity V2 following the recording paper P by blocking torque transmission by the second one-way clutch 122. Further, a rotating resistance of the nudger roll 94 acts on the recording paper P. A tension corresponding to the rotating resistance is caused in a portion bridged between the nip part N and the nudger roll 94.

Figure 4B:
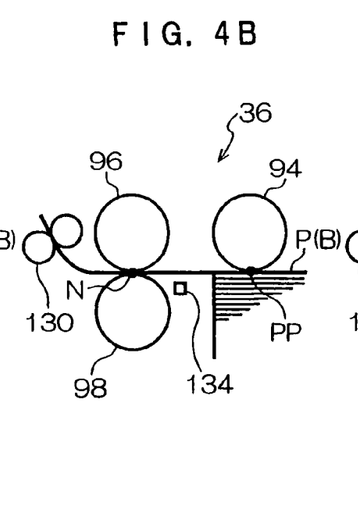

As shown in FIG. 4B, the front edge of the Nth sheet of recording paper P fed by the feed roll 96 and the retard roll 98 in the conveying-out direction is inserted into the nip part of the conveying roll pair 130. Accordingly, the conveying roll pair 130 starts conveying the recording paper P to the image formation part along the conveying guide path 124 at the linear velocity V3 faster than the linear velocity V2 of the feed roll 96 and the retard roll 98 while the recording paper P is nipped. At this time, the first one-way clutch 120 blocks torque transmission so that the feed roll 96 is rotated at a rotating speed corresponding to the linear velocity V3 following the recording paper P. The torque limiter blocks torque transmission so that the retard roll 98 is rotated at a rotating speed corresponding to the linear velocity V3 following the recording paper P.

Figure 4C:
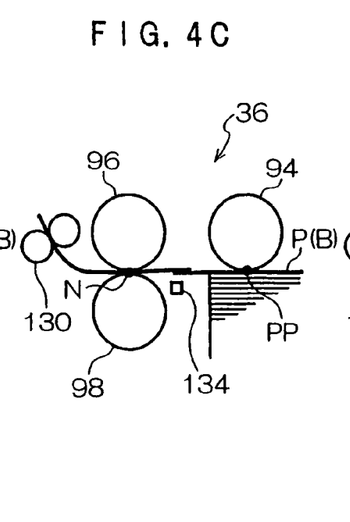

In the sheet feeding mechanism 36, the rear edge of the Nth sheet of recording paper P moved in the conveying-out direction is moved away from the nudger roll 94. At the same time, the second one-way clutch 122 restarts torque transmission from the driving motor 106 to the nudger roll 94 immediately. Accordingly, the nudger roll 94 feeds the (N+1)th sheet of recording paper P from the upper edge side of the sheet bundle B in the conveying-out direction. At this time, as shown in FIG. 4C, the (N+1)th sheet of recording paper P is fed in the conveying-out direction in the state that its front edge is overlapped with the lower side of the rear edge of the Nth sheet of recording paper P (in overlap feed state).

Here, when the rear edge of the Nth sheet of recording paper P moved in the conveying-out direction is moved away from the sheet bundle B, the front edge of the Nth sheet of recording paper P is curved upward by being nipped by the conveying roll pair 130. Accordingly, when the rear edge of the Nth sheet of recording paper P is moved away from the sheet bundle B, the Nth sheet of recording paper P attempts to be restored to a neutral shape (a substantially plane shape), but the rear edge side of the Nth sheet of recording paper P is supported from the lower side by the front edge side of the (N+1)th sheet of recording paper P. Therefore, when the rear edge of the Nth sheet of recording paper P is moved away from the sheet bundle B, instant restoration of the rear edge side of the Nth sheet of recording paper P to a neutral shape by a restoring force can be reliably prevented by the front edge side of the (N+1)th sheet of recording paper P.

Therefore, the gap sensor 134 detects the front edge of the (N+1)th sheet of recording paper P and outputs the front edge detecting signal of the (N+1)th sheet of recording paper P to the control part. When the front edge detecting signal of the (N+1)th sheet of recording paper P is inputted from the gap sensor 134, the control part stops rotation of the driving motor 106 after elapse of a predetermined time from the signal input. Specifically, the control part stops rotation of the driving motor 106 at timing so that the front edge of the (N+1)th sheet of recording paper P is stopped within a predetermined guide section G (see FIG. 4D).

Figure 4D:
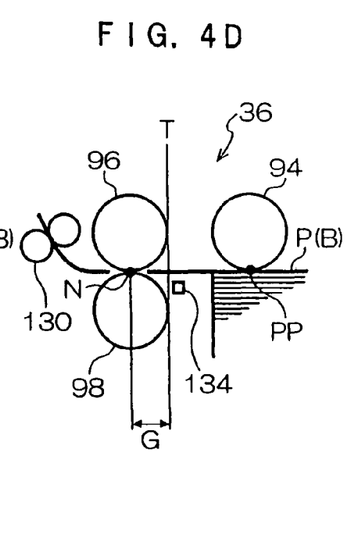

Here, as shown in FIG. 4D, the guide section G is set as a section on the upstream side from the nip part N (not including the nip part N) and on the downstream side from a tangent line T (not including the tangent line T) that contacts with the upstream side edge of the roll surface 97 of the feed roll 96 and the upstream side edge of the roll surface 99 of the retard roll 98. Thus, the front edge of the (N+1)th sheet of recording paper P is stopped in the guide section G. Therefore, when the (N+1)th sheet of recording paper P starts to be fed to the image formation part, even if the front edge of the (N+1)th sheet of recording paper P is bent downward or upward. The (N+1)th sheet of recording paper P can be reliably guided to the nip part N by the roll surfaces 97 and 99.

Next if feeding of plural sheets of recording paper P by the nudger roll 94 from the upper edge side (the topmost part) of the sheet bundle B in the conveying-out direction will be described. In the sheet feeding mechanism 36, when the nudger roll 94 feeds plural or the Nth, (N+1)th, . . . , and (N+n)th sheet of recording paper P in the conveying-out direction, the front edges of the Nth, (N+1)th, . . . , and (N+n)th sheet of recording paper P are detected by the gap sensor 134. The front edge detecting signal is outputted to the control part.

Thereafter, respective front edges of the Nth, (N+1)th, . . . , and (N+n)th sheet of recording paper P are inserted into the nip part N of the feed roll 96 and the retard roll 98. The feed roll 96 is rotated in the normal rotation direction and the retard roll 98 is rotated in the reverse rotation direction. Therefore, only the Nth sheet of recording paper P is fed by the feed roll 96 from the nip part N in the conveying-out direction. The remaining (N+1)th, . . . , and (N+n)th sheet of recording paper P are fed back by the retard roll 98 from the nip part N to the upstream side.

Also, the control part starts feeding the Nth sheet of recording paper P. The front edge detecting signal from the gap sensor 134 is inputted. After elapse of a predetermined threshold time from the input of the detecting signal, when the next front edge detecting signal from the gap sensor 134 is not inputted, the control part determines occurrence of overlap feed of the recording paper P and stops rotation of the driving motor 106. Here, the threshold time for determining an occurrence of overlap feed is set to a time longer than the predetermined time from when the Nth sheet of recording paper P starts to be conveyed out by the nudger roll 94 till it passes through the nip part N. Therefore when plural sheets of recording paper P are overlap fed from the sheet bundle B, only the Nth sheet of recording paper P passes through the nip part N to be conveyed to the image formation part by the conveying roll pair 130. The (N+1)th, . . . , and (N+n)th sheet of recording paper P are returned from the nip part N to the upstream side by the retard roll 98, so that their front edges are stopped to be positioned within the guide section G.

In the above-described sheet feeding mechanism 36 according to this embodiment, if the nudger roll 94 feeds one sheet of recording paper P in the conveying-out direction when the Nth sheet of recording paper P is conveyed out from the sheet bundle B, after the nudger roll 94 is moved away from the rear edge of the Nth sheet of recording paper P being fed from the sheet bundle B in the conveying-out direction, the Nth sheet of recording paper P is fed in the conveying-out direction until the front edge of the (N+1)th sheet of recording paper P reaches the predetermined guide section G set between the sheet bundle B and the feed roll 96 and the retard roll 98 in the state that the following (N+1)th sheet of recording paper P is overlapped with the lower side of the preceding Nth sheet of recording paper P. Therefore, the front edge of the (N+1)th sheet of recording paper P is overlapped with the lower side of the rear edge of the preceding Nth sheet of recording paper P fed in the conveying-out direction. Namely, the front edge of the (N+1)th sheet of recording paper P is contacted with or is sufficiently close to the lower side of the rear edge of the Nth sheet of recording paper P (in overlap feed state). Therefore, when the rear edge of the Nth sheet of recording paper P in curved state is moved away from the sheet bundle B, instant restoration of the rear edge side of the Nth sheet of recording paper P to a neutral shape downward can be prevented by the front edge of the (N+1)th sheet of recording paper P.

Further, in the sheet feeding mechanism 36, when plural sheets of recording paper P are fed by the nudger roll 94 in the conveying-out direction, the (N+1)th, . . . , and (N+n)th sheet of recording paper P are returned by the retard roll 98 from the nip part N to the upstream side so that their front edges are also stopped to be positioned within the guide section G. Therefore, when the rear edge of the Nth sheet of recording paper P in curved state is moved away from the sheet bundle B, instant restoration of the rear edge side of the Nth sheet of recording paper P to a neutral shape downward can be prevented by the front edges of the (N+1)th, . . . , and (N+n)th sheet of recording paper P.

As a result, the sheet feeding mechanism 36 according to this embodiment can prevent any flexing sound caused when the rear edge side of the Nth sheet of recording paper in curved state is restored to a neutral shape and any slapping sound caused when the rear edge of the recording paper P restored to a neutral shape hits the conveying-out plate 100. Further, no special parts need to be added specifically for preventing such flexing sounds and slapping sounds of the recording paper P, therefore an increase of the number of parts of the device making the construction of the device (sheet feeding mechanism) complicated can be prevented.

Second Embodiment

Figure 5A:
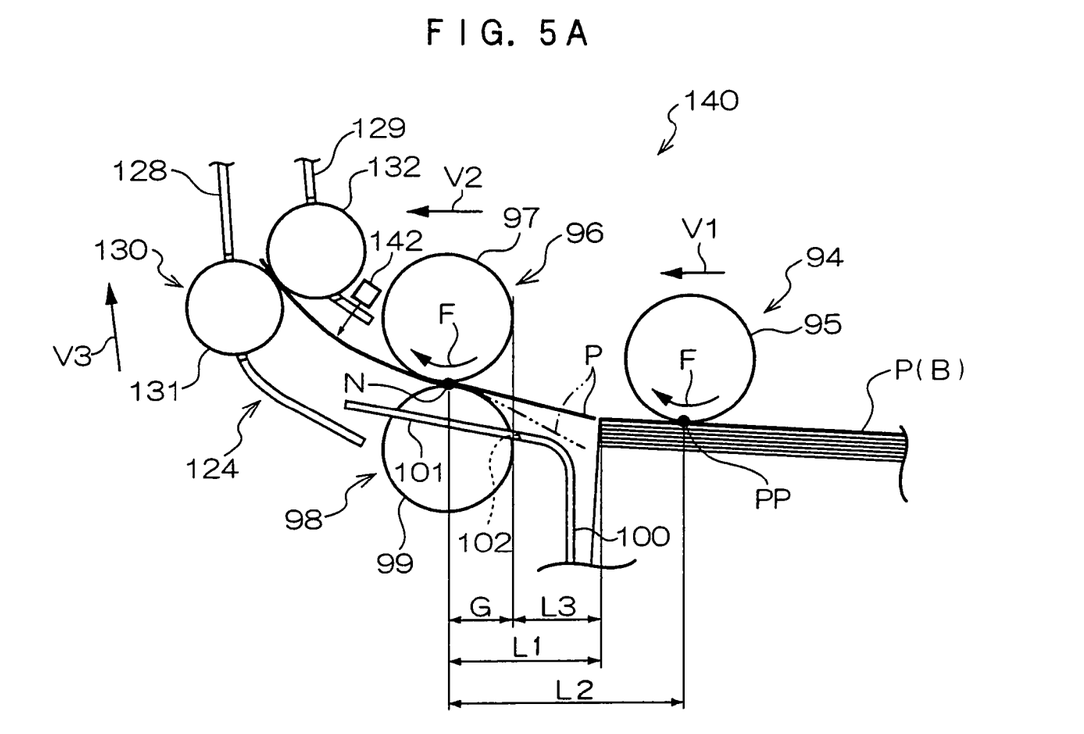
FIG. 5A is a side view showing the construction of a sheet feeding mechanism according to a second embodiment of the present invention.
Figure 5B:
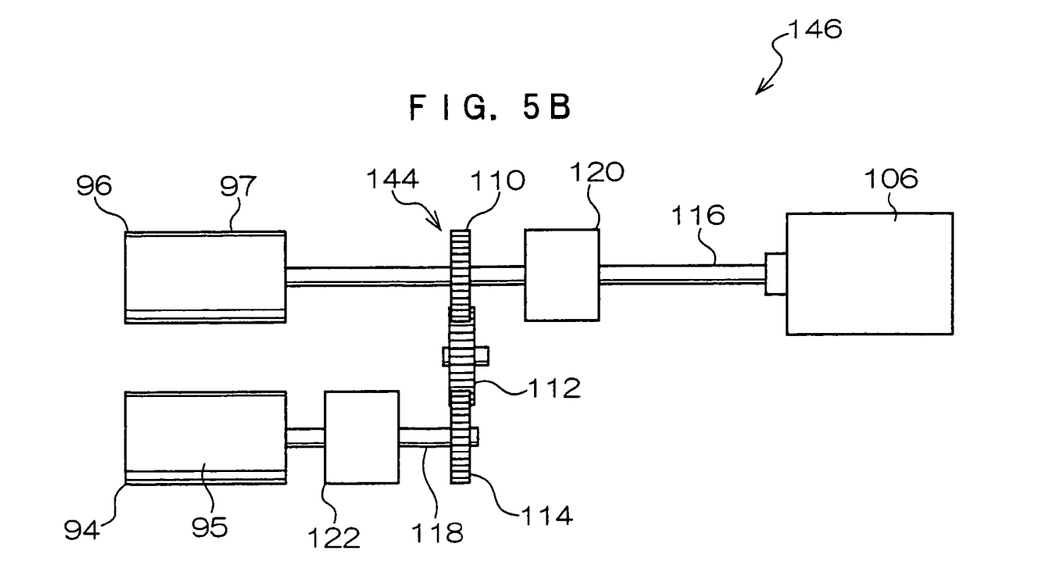
FIG. 5B is a plan view showing the construction of a gear train transmitting torque from a driving motor to a nudger roll and a feed roll in the sheet feeding mechanism according to the second embodiment.

FIG. 5 shows a sheet feeding mechanism according to a second embodiment of the present invention. In place of the sheet feeding mechanism 36 according to the first embodiment, a sheet feeding mechanism 140 can be applied to a laser printer 21. The same parts as the sheet feeding mechanism 36 according to the first embodiment are indicated by the same reference numerals and the description thereof is therefore omitted.

The difference of the sheet feeding mechanism 140 according to this embodiment from the sheet feeding mechanism 36 according to the first embodiment is that, as opposed to the gap sensor 134 being provided on the lower side of the conveying-out guide plate 100 in the sheet feeding mechanism 36, such gap sensor is omitted in the sheet feeding mechanism 140. In the sheet feeding mechanism 140, the control part determines the presence or absence of any misfeed of the recording paper P from the sheet bundle B based on a detecting signal from an edge sensor 142 arranged between the feed roll 96 and the retard roll 98 and the conveying-out roll pair 130 and that detects the front edge and the rear edge of the recording paper P.

As shown in FIG. 5B, as in the sheet feeding mechanism 36 according to the first embodiment, the sheet feeding mechanism 140 is provided with a roll-driving control part 146 for transmitting torque from the driving motor 106 via a gear train 144 to the nudger roll 94, the feed roll 96, and the retard roll 98 and controlling the torque transmitted to the rolls 94, 96, and 98.

Here, a distance from the front edge of the sheet bundle B housed in the sheet feeding cassette 82 to the terminal end of the guide section G is L1; a distance from a press-contact point PP of the roll surface 95 of the nudger roll 94 on the sheet bundle B to the nip part N of the feed roll 96 and the retard roll 98 is L2; a distance from the front edge of the sheet bundle B housed in the sheet feeding cassette 82 to the start end of the guide section G is L3; a linear velocity of the roll surface 95 of the nudger roll 94 is V1; and a linear velocity of the roll surface 97 of the feed roll 96 is V2. The gear train 144 sets a rotating speed of the nudger roll 94 and a rotating speed of the feed roll 96 so that the linear velocity V1 of the nudger roll 94 satisfies the following equation (A).

$$V2 \times (L3/L2) < V1 < V2 \times (L1/L2) \quad (A)$$

Namely, the feed roll 96 is coupled via the driving shaft 116 to the driving motor 106. The reduction gear ratio of the driving motor 106 and the feed roll 96 is 1. Accordingly, the ratio of a rotating speed of the nudger roll 94 and a rotating speed of the feed roll 96 is determined by a reduction gear ratio R from the driving gear 110 to the second follower gear 114 of the gear train 144. The linear velocity of the nudger roll 94 and the linear velocity of the feed roll 96 are determined by the respective roll diameters and rotating speeds. The gear train 144 sets the reduction gear ratio R to correspond with the above equation (A) and the roll diameters of the nudger roll 94 and the feed roll 96 respectively.

Next, the operation and function of the thus-constructed sheet feeding mechanism 140 according to this embodiment will be described.

In the laser printer 21 applying the sheet feeding mechanism 140 according to this embodiment, when a print instruction and image information are inputted from an information processing device such as a server and a PC or the like to the control part, the control part starts rotating the driving motor 106 of the sheet feeding mechanism 140 and the driving motor (not shown) of the conveying system. Accordingly, in the sheet feeding mechanism 140, torque is transmitted from the driving motor 106 via the gear train 144 to the nudger roll 94, the feed roll 96, and the retard roll 98 and is transmitted from the driving motor of the conveying system to the driving roll 132 of the conveying roll pair 130. The conveying roll pair 130 starts rotating at a rotating speed corresponding to the linear velocity V3 and the nudger roll 94 starts rotating at a rotating speed corresponding to the linear velocity V1. The feed roll 96 starts rotating at a rotating speed corresponding to the linear velocity V2. The retard roll 98 to which torque is transmitted from the driving motor 106 via the torque limiter rotates at a rotating speed corresponding to the linear velocity V2 following the feed roll 96.

In the sheet feeding mechanism 140, the nudger roll 94 rotated in the normal rotation direction feeds one or plural sheets of recording paper P from the upper edge side of the sheet bundle B housed in the sheet feeding cassette 82 in the conveying-out direction. First, the case in which one sheet of recording paper P (the recording paper P is the Nth (N is a natural number of 1 or above) sheet of recording paper fed from the sheet bundle B placed in the sheet feeding cassette 82) is fed by the nudger roll 94 from the upper edge side (the topmost part) of the sheet bundle B in the conveying-out direction will be described. The front edge of the Nth sheet of recording paper P fed from the nudger roll 94 in the conveying-out direction is inserted into the nip part N of the feed roll 96 and the retard roll 98 (see FIG. 4A). The feed roll 96 and the retard roll 98 start conveying the recording paper P in the conveying-out direction at the linear velocity V2 faster than the linear velocity V1 of the nudger roll 94 while the recording paper P is nipped (see FIG. 4B). At this time, the nudger roll 94 is rotated at a rotating speed corresponding to the linear velocity V2 following the recording paper P by blocking torque transmission by the second one-way clutch 122. A rotating resistance of the nudger roll 94 acts on the recording paper P. A tension corresponding to the rotating resistance is caused in a portion bridged between the nip part N and the nudger roll 94.

The front edge of the Nth sheet of recording paper P fed in the conveying-out direction by the feed roll 96 and the retard roll 98 is inserted into the nip part of the conveying roll pair 130. Accordingly, the conveying roll pair 130 starts conveying the recording paper P to the image formation part along the conveying guide path 124 at the linear velocity V3 faster than the linear velocity V2 of the feed roll 96 and the retard roll 98 while the recording paper P is nipped. At this time the first one-way clutch 120 blocks torque transmission so that the feed roll 96 is rotated at a rotating speed corresponding to the linear velocity V3 following the recording paper P. The torque limiter blocks torque transmission so that the retard roll 98 is rotated at a rotating speed corresponding to the linear velocity V3 following the recording paper P.

In the sheet feeding mechanism 140, the rear edge of the Nth sheet of recording paper P moved in the conveying-out direction is moved away from the nudger roll 94 and, at the same time, the second one-way clutch 122 restarts torque transmission from the driving motor 106 to the nudger roll 94 immediately. Therefore, the nudger roll 94 feeds the (N+1)th sheet of recording paper P from the upper edge side of the sheet bundle B in the conveying-out direction. At this time, in the same way as in the sheet feeding mechanism 36 according to the first embodiment, the (N+1)th sheet of recording paper P is fed in the conveying-out direction in the state that its front edge is overlapped with the lower side of the rear edge of the Nth sheet of recording paper P (in an overlap feed state) (see FIG. 4C). When the rear edge of the Nth sheet of recording paper P is moved away from the sheet bundle B, instant restoration of the rear edge side of the Nth sheet of recording paper P to a neutral shape by a restoring force can be reliably prevented by the front edge side of the (N+1)th sheet of recording paper P.

Therefore, the control part sychronizes with a timing in which the Nth sheet of recording paper P passes through the nip part N based on the front edge detecting signal of the Nth sheet of recording paper P from the edge sensor 142 and stops rotation of the driving motor 106. Therefore, the rotation of the nudger roll 94 is stopped and movement of the (N+1)th sheet of recording paper P in the conveying-out direction is stopped. At this time the front edge of the (N+1)th sheet of recording paper P reaches within the predetermined guide section G.

Next if feeding of plural sheets of recording paper P by the nudger roll 94 from the upper edge side (the topmost part) of the sheet bundle B in the conveying-out direction will be described. In the sheet feeding mechanism 140, when the nudger roll 94 feeds plural or the Nth, (N+1)th, . . . , and (N+n)th sheet of recording paper P in the conveying-out direction, the front edges of the Nth, (N+1)th, . . . , and (N+n)th sheet of recording paper P are inserted into the nip part N of the feed roll 96 and the retard roll 98. At this time the feed roll 96 is rotated in the normal rotation direction and the retard roll 98 is rotated in the reverse rotation direction. Therefore, only the Nth sheet of recording paper P is fed by the feed roll 96 from the nip part N in the conveying-out direction. The remaining (N+1)th, . . . , and (N+n)th sheet of recording paper P are fed back by the retard roll 98 from the nip part N to the upstream side (the guide section G).

Also, the control part sychronizes with a timing in which the Nth sheet of recording paper P passes through the nip part N based on the front edge detecting signal of the Nth sheet of recording paper P from the edge sensor 142 and stops rotation of the driving motor 106. Therefore, the rotation of the nudger roll 94 is stopped and movement of the (N+1)th sheet of recording paper P in the conveying-out direction is stopped. At this time, the front edge of the (N+1)th sheet of recording paper P reaches within the predetermined guide section G.

The above-described sheet feeding mechanism 140 according to this embodiment can obtain basically the same function and effect as the sheet feeding mechanism 36 according to the first embodiment. Further, even though a gap sensor for detecting overlap feeding of the recording paper P does not exist between the nudger roll 94 and the feed roll 96/retard roll 98, rotation of the driving motor 106 can be stopped at a timing in which the front edge of the (N+1)th sheet of recording paper P or the front edges of the (N+1)th, . . . , and (N+n)th sheet of recording paper P reach the guide section G.

Noted that in the sheet feeding mechanism 140 according to this embodiment, the control part determines a timing in which the Nth sheet of recording paper P passes through the nip part N based on the detecting signal from the gap sensor 134. However, the control part may also determine the timing in which the Nth sheet of recording paper P passes through the nip part N by measuring the time from the rotation start of the nudger roll 94 (driving motor 106) by a timer.

In the sheet feeding mechanisms 36 and 140 according to the first and second embodiments, the front edge of the (N+1)th sheet of recording paper P or the front edges of the (N+1)th, . . . , and (N+n)th sheet of recording paper P are stopped in the predetermined guide section G and the recording paper P is guided to the nip part N by the roll surfaces 97 and 99. The front edge of the (N+1)th sheet of recording paper P or the front edges of the (N+1)th, . . . , and (N+n)th sheet of recording paper P may be slightly extended from the front edge of the sheet bundle B so that any flexing sound and slapping sound caused when the Nth sheet of recording paper P is moved away from the sheet bundle B can be reduced. Therefore, when only the reduction of such flexing sounds and slapping sounds is being considered, the sheet feeding mechanism 36 according to the first embodiment may stop rotation of the driving motor 106 before the front edge of the (N+1)th sheet of recording paper P or the front edges of the (N+1)th, . . . , and (N+n)th sheet of recording paper P reach the guide section G. Further, in the sheet feeding mechanism 36 according to the second embodiment, the gear train 144 may set the rotating speed of the nudger roll 94 so that the linear velocity V1 of the nudger roll 94 satisfies the following equation (B).

$$0 < V1 < V2 \times (L1/L2) \tag{B}$$

The sheet material feeding device according to the present invention is not limited to the above descriptions. Namely, the sheet material feeding device according to the first embodiment of the present invention including: a sheet material housing part housing a sheet bundle having plural stacked sheets; a conveying-out unit press-contacting onto the front edge side of the upper surface of the sheet bundle housed in the sheet material housing part to exert a push-out force, feeding a sheet of the sheet material stacked on the upper edge side of the sheet bundle by the push-out force in a predetermined conveying-out direction, and separating the sheet from the sheet bundle; a feeding unit arranged on the downstream side of the sheet material housing part along the conveying-out direction and continuing the feeding of the sheet fed from the sheet bundle by the conveying-out unit in the conveying-out direction, wherein when the sheet material is conveyed out from the sheet bundle when the rear edge of a preceding sheet being fed from the sheet bundle in the conveying-out direction moves away from the conveying-out unit the following sheet is fed in the conveying-out direction until the front edge of the following sheet reaches a predetermined guide position, set between the sheet bundle and the feeding unit, in a state in which the following sheet is overlapped at the lower side of the preceding sheet.

In a sheet material feeding device according to the first aspect, when a sheet is conveyed out from a sheet bundle, the rear edge of a preceding sheet being fed from the sheet bundle in a conveying-out direction moves away from the conveying-out unit. The preceding sheet is fed in the conveying-out direction until the front edge of the following sheet reaches a predetermined guide position between the sheet bundle and the feeding unit in the state that the following sheet is overlapped with the lower side of the preceding sheet. Accordingly, the front edge of the following sheet is overlapped with the lower side of the rear edge of the preceding sheet being fed in the conveying-out direction. In other words, the front edge of the following sheet is contacted with or is sufficiently close to the rear edge of the preceding sheet (in an overlap feed state). Therefore, even if the preceding sheet is in a curved state, when the rear edge of the preceding sheet is moved away from the sheet bundle or the sheet material housing part, instant restoration of the rear edge side of the preceding sheet material to a neutral shape downward may be prevented by the front edge of the following sheet material.

As a result in the sheet material feeding device according to the first aspect, any flexing sound caused when the rear edge side of the preceding sheet material in curved state may be restored to a neutral shape and any slapping sound caused when the rear edge of the sheet material restored to a neutral shape hits the guide plate may be effectively reduced or prevented. Further, specifically for preventing such flexing sounds and slapping sounds of the preceding sheet material no special parts may need to be added, therefore an increase of the number of parts of the device to make the construction of the device complicated may be prevented.

In the sheet material feeding device according to the first aspect, the conveying-out unit may have a nudger roll press-contacting a roll surface onto the front edge side of the upper surface of the sheet bundle housed in the sheet material housing part and rotate in the normal rotation direction corresponding to the conveying-out direction to exert a push-out force onto the sheet bundle, and a roll-driving control part controlling rotation and rotation stop of the nudger roll, wherein when the sheet is conveyed out from the sheet bundle, the roll-driving control part starts rotating the nudger roll in the normal rotation direction and then when the front edge of the following sheet fed by the nudger roll from the sheet bundle in the conveying-out direction reaches the guide position, and the roll-driving control part may stop rotation of the nudger roll.

The sheet material feeding device according to the first aspect may further have a front edge sensor detecting the front edge of the following sheet fed by the nudger roll from the sheet bundle in the conveying-out direction between the nudger roll and the feeding unit.

In the sheet material feeding device according to the first aspect, the feeding unit may have a feed roll press-contacting a roll surface onto the upper surface side of the sheet fed from the sheet bundle by the nudger roll and rotating in a normal rotation direction corresponding to the conveying-out direction to exert a push-out force onto the sheet in the conveying-out direction, and a retard roll press-contacting a roll surface onto the lower surface side of the sheet material fed from the sheet bundle by the nudger roll, if a single sheet is fed from the sheet bundle, feeding the single sheet with the feed roll in the conveying-out direction, and if plural sheets are fed from the sheer bundle, pressing sheets, other than the topmost sheet from, back from a nip part of the feed roll and the retard roll to the guide position.

In the sheet material feeding device according to the first aspect, the roll-driving control part may rotate the nudger roll in the normal rotation direction so that a linear velocity of the roll surface of the nudger roll is slower than a linear velocity of the roll surface of the feed roll.

In the sheet material feeding device according to the first aspect, the roll-driving control part may have a one-way clutch permitting rotation of the nudger roll in the normal rotation direction following the preceding sheet nipped by the feed roll and the retard roll and fed in the conveying-out direction.

In the sheet material feeding device according to the first aspect, when a distance from the front edge of the sheet bundle housed in the sheet material housing part to the guide position is L1, a distance from a press-contact point on the sheet bundle by the roll surface of the nudger roll to the nip point of the feed roll and the retard roll is L2, a linear velocity of the roll surface of the nudger roll is V1, and a linear velocity of the roll surface of the feed roll is V2, the roll-driving control part may set a rotating speed of the nudger roll and a rotating speed of the feed roll so that the linear velocity V1 of the roll surface of the nudger roll satisfies the following equation (B).

$$0<V1<V2\times(L1/L2) \tag{B}$$

As described above, the sheet material feeding device according to the present invention may effectively reduce any flexing sound and any slapping sound caused when the rear edge of the sheet material separated from the sheet bundle by the conveying-out unit is moved away from the sheet bundle and may prevent making the device construction complicated in order to prevent such flexing sounds and slapping sounds of the sheet material.

What is claimed is:

1. A sheet material feeding device, comprising:
   a sheet material housing part housing a sheet bundle having a plurality of sheet being stacked;
   a conveying-out unit press-contacting onto the front edge side of the upper surface of the sheet bundle housed in the sheet material housing part to exert a push-out force, feeding a sheet stacked on the upper edge side of the sheet bundle by the push-out force in a predetermined conveying-out direction, and separating the sheet from the sheet bundle;
   a feeding unit arranged on the downstream side of the sheet material housing part along the conveying-out direction and continuing the feeding of the sheet fed from the sheet bundle by the conveying-out unit in the conveying-out direction;
   a conveying-out guide part provided between the conveying-out unit and the feeding unit, and being bent in substantially inverted V shape, wherein after the conveying-out unit moves away from the rear edge of a preceding sheet, the conveying-out unit conveys a following sheet in the conveying-out direction in a state that the following sheet is overlapped at the lower side of the preceding sheet until the front edge of the following sheet reaches a predetermined guide position set between the sheet bundle and the feeding unit, and the conveying-out unit continues driving after the rear edge of the preceding sheet moves away from the conveying-out unit and until the front edge of the following sheet reaches the predetermined guide position;
   wherein the conveying-out unit has a nudger roll press-contacting a roll surface onto the front edge side of the upper surface of the sheet bundle housed in the sheet material housing part and rotating in a normal rotation direction corresponding to the conveying-out direction to exert the push-out force onto the sheet bundle, and a roll-driving control part controlling rotation of the nudger roll,
   the roll-driving control part starts rotating the nudger roll in the normal rotation direction to convey out the sheet from the sheet bundle, and stops rotating the nudger roll when the front edge of the following sheet reaches the guide position;
   wherein the feeding unit has a feed roll press-contacting a roll surface onto the upper surface side of the sheet fed from the sheet bundle by the nudger roll and rotating in a normal rotation direction corresponding to the conveying-out direction to convey the sheet; and
   a retard roll press-contacting a roll surface onto the lower surface side of sheet fed from the sheet bundle by the nudger roll and the roll-driving control part controls rotation of the nudger roll in the normal rotation direction so that a linear velocity of the roll surface of the nudger roll is slower than a linear velocity of the roll surface of the feed roll.

2. The sheet material feeding device according to claim 1, wherein the roll-driving control part has a one-way clutch permitting rotation of the nudger roll in the normal rotation direction following the preceding sheet, nipped by the feed roll and the retard roll and fed in the conveying-out direction.

3. The sheet material feeding device according to claim 1, further comprising a front edge sensor detecting the front edge of the following sheet fed by the nudger roll from the sheet bundle between the nudger roll and the feeding unit.

4. The sheet material feeding device according to claim 1, wherein the feeding unit, comprises:
   a feed roll, press-contacting a roll surface onto the upper surface side of the sheet fed from the sheet bundle by the nudger roll and rotating in a normal rotation direction corresponding to the conveying-out direction to exert a push-out force in the conveying-out direction onto the sheet; and a retard roll, press-contacting a roll surface onto the lower surface side of sheet fed from the sheet bundle by the nudger roll, and, if a single sheet is fed from the sheet bundle, the retard roll feeding the single sheet with the feed roll in the conveying-out direction, and, if a plurality of sheets are fed from the sheet bundle, the retard roll pressing sheets other than the topmost sheet back from a nip part of the feed roll and the retard roll to the guide position.

5. The sheet material feeding device according to claim 1, wherein the roll-driving control part sets a rotating speed of the nudger roll and a rotating speed of the feed roll so that the linear velocity V1 of the roll surface of the nudger roll satisfies the following equation (1), $$0 < V1 < V2 \times (L1/L2) \qquad (1)$$

wherein L1 denotes a distance from the front edge of the sheet bundle housed in the sheet material housing part to the guide position, L2 denotes a distance from a press-contact point on the sheet bundle by the roll surface of the nudger roll to a nip point of the feed roll and the retard roll, V1 denotes a linear velocity of the roll surface of the nudger roll, and V2 denotes a linear velocity of the roll surface of the feed roll.

6. A sheet material feeding device, comprising:
a sheet material housing part housing a sheet bundle having a plurality of sheets being stacked;
a conveying-out unit feeding the sheet material on the top side of the sheet bundle housed in the sheet material housing part in a predetermined conveying-out direction; and
a feeding unit arranged on the downstream side of the sheet material housing part along the conveying-out direction and continuing the feeding of the sheet material fed from the sheet bundle by the conveying-out unit in the conveying-out direction; and
a conveying-out guide part provided between the conveying-out unit and the feeding unit, and being bent in substantially inverted V shape, wherein the conveying-out unit feeds the front edge of the following sheet overlapped at the lower side of the preceding sheet from the sheet bundle in the conveying-out direction, and the conveying-out unit continues driving after the rear edge of the preceding sheet moves away from the conveying-out unit and until the front edge of the following sheet reaches the predetermined guide position;
wherein, after the conveying-out unit moves away from the rear edge of a preceding sheet, the conveying-out unit conveys a following sheet in the conveying-out direction in a state that the following sheet is overlapped at the lower side of the preceding sheet until the front edge of the following sheet reaches a predetermined guide position set between the sheet bundle and the feeding unit;
wherein the conveying-out unit has a nudger roll press-contacting a roll surface onto the front edge side of the upper surface of the sheet bundle housed in the sheet material housing part and rotating in a normal rotation direction corresponding to the conveying-out direction to exert a push-out force onto the sheet bundle, and a roll-driving control part controlling the nudger roll,
wherein the roll-driving control part starts rotating the nudger roll in the normal rotation direction, and, when the front edge of the following sheet fed by the nudger roll from the sheet bundle in the conveying-out direction reaches the guide position, the roll-driving control part stops the rotation of the nudger roll;
wherein the feeding unit has a feed roll, press-contacting a roll surface onto the upper surface side of the sheet fed from the sheet bundle by the nudger roll and rotating in a normal rotation direction corresponding to the conveying-out direction to convey the sheet, and a retard roll press-contacting a roll surface onto the lower surface side of the sheet fed from the sheet bundle by the nudger roll,
wherein the roll-driving control part rotates the nudger roll in the normal rotation direction so that a linear velocity of the roll surface of the nudger roll is slower than a linear velocity of the roll surface of the feed roll.

7. The sheet material feeding device according to claim 6, wherein the feeding unit includes: a feed roll, press-contacting a roll surface onto the upper surface side of the sheet fed from the sheet bundle by the nudger roll, and rotating in a normal rotation direction corresponding to the conveying-out direction to exert a push-out force in the conveying-out direction onto the sheet material; and a retard roll, press-contacting a roll surface onto the lower surface side of the sheet fed from the sheet bundle by the nudger roll, and, if a single sheet is fed from the sheet bundle, the retard roll feeding the single sheet with the feed roll in the conveying-out direction, and, if a plurality of sheets are fed from the sheet bundle, the retard roll pressing sheets, other than the topmost sheet, back from a nip part of the feed roll and the retard roll to the guide position.

8. The sheet material feeding device according to claim 7, further comprising a front edge sensor detecting the front edge of the preceding sheet fed by the nudger roll from the sheet bundle in the conveying-out direction between the nudger roll and the feeding unit, wherein if the front edge sensor does not detect the front edge of the following sheet after elapse of a predetermined time, it is determined that a plurality of sheets have been fed from the sheet bundle.

9. The sheet material feeding device according to claim 6, wherein the roll-driving control part has a one-way clutch permitting rotation of the nudger roll in the normal rotation direction following the preceding sheet, nipped by the feed roll and the retard roll and fed in the conveying-out direction.

10. The sheet material feeding device according to claim 1, wherein the feeding unit includes:
a feed roll, press-contacting a roll surface onto the upper surface side of the sheet fed from the sheet bundle by the conveying-out unit, and rotating in a normal rotation direction corresponding to the conveying-out direction to convey the sheet; and
a retard roll, press-contacting a roll surface onto the lower surface side of the sheet fed from the sheet bundle by the conveying-out unit,
wherein the guide position is a zone between a nip part of the feed roll and the retard roll and a tangent line of the upstream side edges of the feed roll and the retard roll.

11. The sheet material feeding device according to claim 6, wherein the roll-driving control part sets a rotating speed of the nudger roll and a rotating speed of the feed roll so that the linear velocity V1 of the roll surface of the nudger roll satisfies the following equation (1), $$0 < V1 < V2 \times (L1/L2) \qquad (1)$$

wherein L1 denotes a distance from the front edge of the sheet bundle housed in the sheet material housing part to the guide position, L2 denotes a distance from a press-contact point to the sheet bundle of the roll surface of the nudger roll to a nip point of the feed roll and the retard roll, V1 denotes a linear velocity of the roll surface of the nudger roll, and V2 denotes a linear velocity of the roll surface of the feed roll.

12. The sheet material feeding device according to claim 6, further comprising a front edge sensor provided between the nudger roll and the feeding unit, wherein when the front edge sensor detects the front edge of the following sheet, fed by the nudger roll from the sheet bundle in the conveying-out direction, the roll-driving control part stops the rotation of the nudger roll.

13. The sheet material feeding device according to claim 6, further comprising an edge sensor provided downstream of the feeding unit, wherein when the edge sensor detects the front edge of the preceding sheet that has passed through the feeding unit the roll-driving control part stops the rotation of the nudger roll.

* * * * *